3,364,562
METHOD OF MAKING A BUTT JOINT BY EXPLOSIVE WELDING
Edward L. Armstrong, Minneapolis, Minn., assignor to North American Aviation, Inc.
Original application Nov. 8, 1962, Ser. No. 236,211. Divided and this application Dec. 10, 1965, Ser. No. 545,779
1 Claim. (Cl. 29—470.1)

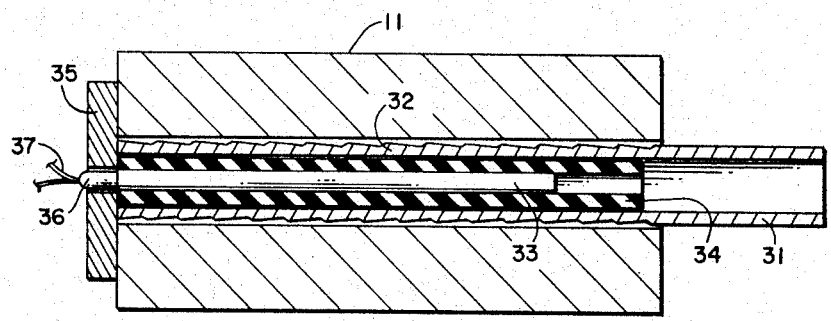
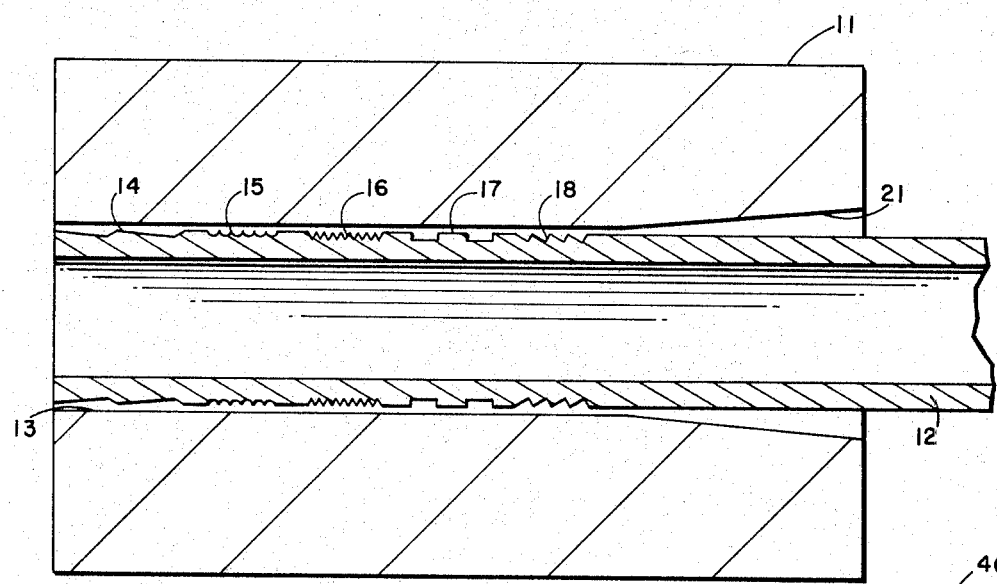
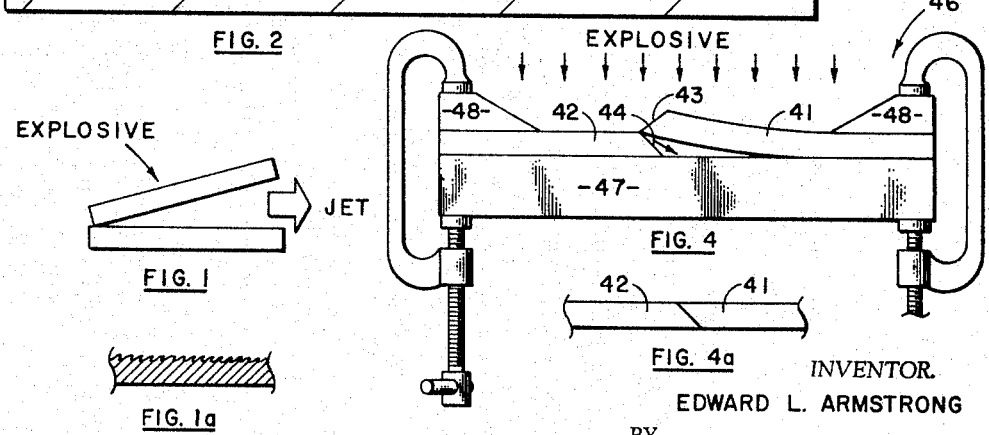

This is a division of application Ser. No. 236,211, filed Nov. 8, 1962, now abandoned.

This invention pertains to a novel method of welding. More particularly, the invention pertains to a novel method of welding utilizing explosive energy.

The herein invention utilizes the high pressure realized from the detonation of an explosive to cold weld similar or dissimilar metals. The steps that will be set forth can relate to short or long lap joints or can be utilized in the particular area of welding or bonding tubes to the usual tube sheet utilized in tube and sheet heat exchangers. Additionally, there is no successful means previously known for welding refractory materials and many of the high temperature metals. The apparatus that is available for welding or bonding unusual materials is normally of a very complex nature and is quite large, cumbersome and bulky. As a result, this type of equipment is not feasible for utilization in welding applications in outer space where weight and size considerations become a factor of great importance.

An object of this invention is to describe a new method for cold welding of similar or dissimilar metals.

An additional object of this invention is to provide a method for welding of materials normally not joinable by conventional welding techniques, such materials including refractory materials and high temperature metals and alloys.

Another object of this invention is to provide a simple, compact method for cold welding of metals for use in outer space applications.

A still further object of this invention is to provide for a continuous metallurgical bond in sealing tubes to the tube sheet of a heat exchanger.

Other objects and attendant advantages of the present invention will become more apparent from the detailed drawings.

The invention herein described consists of providing one of the two surfaces to be joined by the application of explosive force with a surface having a multitude of angles relative to the other sheet or material to which it is joined. The multi-angular surfaced material may be prepared by providing a plurality of V-shaped grooves, broad shallow grooves, a multitude of tapers, surface moldings or the like in various types of geometrical configurations so as to provide the desired angular surface. In joining the two workpieces, the angular surfaced one is placed in relatively close proximity or abutting relationship to another plane-surfaced workpiece forming included angles therewith. An explosive charge is detonated so as to cause the materials to be joined. The explosive utilized is chosen to produce an explosive force sufficient to drive the pieces together creating the desired bonding. The same effect may alternatively be accomplished by providing both of the abutting surfaces to be joined with complementary angular surfaces, such that a net result similar to that described with relation to one angular surface alone is obtained. It is believed the invention will be better understood with relation to the following detailed drawings and descriptions in which:

FIG. 1 is an illustration of two flat surfaces to be joined having an explosive force applied to one side of the two flat surfaces and illustrating a jet formation.

FIG. 1a is a cross-sectional view of a piece subjected to an explosive jet.

FIG. 2 is a cross-sectional view of a tube and sheet having a variety of angular configurations provided on the tube.

FIG. 3 is a cross-sectional view of a tube to be joined to a tube sheet indicating the relative placement of the explosive charge utilized in accordance with this invention.

FIG. 4 is an additional embodiment of the invention.

FIG. 4a is the finished piece of that shown in FIG. 4.

The collision of solid bodies moving at high speeds produces large pressure shock waves, large strains and in certain instances instability which may result in a breakup of surfaces and formation of high velocity fluid-like jets. As seen in FIG. 1 when two slabs of metal are in abutting relationship at the left of the two pieces and force is applied to either one or both of the two members so as to cause them to be brought together, a shock wave is formed by the force of the rapid movement of air between the two pieces. This shock wave is commonly referred to as a jet. The jet is the result of a rapidly-formed high pressure region between the two pieces due to their relative movement one to the other. Attendant with this rapid increase of the pressure between the two pieces is a rapid increase in temperature such that the surface of the metal is melted or the adjoining metals go into solid solution. In FIG. 1a showing a cross section of a piece so-exposed to jet action, a plurality of wave-like motions is found on the surface of the member subjected to the jet. These waves are a result of the shock wave passing over the surface of the metal as it is brought together with the opposite piece. The phenomenon recited with relation to the creation of a jet between adjoining metal members particularly lends itself to the field of explosive energy where great and rapid forces can be exerted upon surfaces desired to be formed. It is the utilization of this jet principle that forms the basis for the invention as will hereinafter be explained.

In welding or bonding materials utilizing the jet force, it is important to note that the welding is dependent on the force supplied, type of material utilized, the jet angle and distance between the two materials being formed. With the type of relationship between the two pieces as shown in FIG. 1, it is to be pointed out that beyond the first one or two inches from the hinged portion or abutting portion, the two parts are physically too far separated to be welded. Beyond the aforesaid first one or two inches the effect of the jet is substantially dissipated and virtually no surface melting would occur.

As seen in FIG. 2 and as will be described, the invention provides a method of welding or bonding material utilizing the jet effect such that large sheets or cylindrical sections such as in a tube and sheet heat exchanger may be welded. In FIG. 2, a tube sheet 11 is prepared to receive the tube member 12 within the opening 13 which has a diameter slightly larger than that of the tube. By way of illustration the tube member 12 is shown as being provided with a plurality of different types of angular configurations upon the outer circumference thereof so as to utilize the effects of the inventive concept as disclosed. Any one of the configurations shown would suffice for effecting the desired bonding of the tube to the tube sheet. Alternatively, these configurations may be cut into a flat surface when it is desired to bond it to another surface of that type. For example, the tube may be prepared with a plurality of successive small tapers 14 about the circumference. A knurled preparation 15 on the tube also effects the desired end result. As is indicated, circumferential V-shaped grooves 16 around the tube, shallow, broad grooves 17 and the sawtooth-shape circumferential grooves 18 additionally provide a desired angular outer surface on the tube to be bonded. Furthermore, additional ways of preparing the tube include slightly tapering as at 21 the tube sheet adjacent the end thereof. When extending the concept to flat sheets, corrugated sheet members may be utilized to effectively encompass the concept of the invention. It should be established that the particular geometrical configurations shown and discussed are by way of example only and that virtually any surface preparation that permits a plurality of multi-angular surfaces will generally suffice for the purposes of explosive bonding as taught in this invention. As previously indicated, the tube sheet holes may be provided with such multi-angular surfaces rather than the tubes utilized.

When detonating an explosive charge within the tube as will hereinafter be explained, a jet is produced at each of the many angles presented by the structural configuration of the two pieces to be joined. For example, at each V-groove or knurl or sawtooth and the like a small jet is formed upon the detonation of the explosive utilized. This jet, as previously discussed, serves to slightly melt the surfaces of the two materials being joined permitting a fusion upon their contact or cause the two materials to go into solid solution giving a metallurgical bond without fusion. It is apparent that this feature of the invention relies upon a plurality of small included angles between the pieces being joined such that there is virtually no dissipation of the effect of the jet created between such included angles. As can be seen, a successive series of small jets is effected by the invention to produce the desired end result.

*Example*

FIG. 3 represents the positioning of the explosive and tube prior to the joining operation. Tube 31 is provided with concentric tapers 32 by a machining operation. The tube 31 was 304 stainless steel, one-half inch IPS schedule 40. The tapers were three-quarters of an inch long and had a 2° inclination. Prior to the tube insertion in the tube sheet to which it is to be bonded, the tube and sheet were cleaned with acetone. The explosive charge 33 is first inserted into either a Tygon tubing or black rubber hose 34 which serves as the shock transport media. Other material may be used which will suffice for transporting the shock than specifically enumerated, however. Specifically, other transfer mediums such as water, plastics and the like are applicable. The explosive charge which is encased by the transport medium is then inserted into the tube to be bonded. The tube may be made typically out of 304 stainless steel. A flat, hard rubber disc 35 is placed over and adhesively bonded to the exposed base of the tube sheet 11 to protect it from marring by the resultant explosive fragments. Finally, a detonation cap 36 having leads to a detonator is attached and the charge is detonated.

Upon inspection, a successful bonding of the tube to the tube sheet was obtained. The bonded area varied from continuous fusion to intermittent fusion to metallurgical bonding without fusion. This result is probably due to a process variable such as shock wave geometry. The specimen was helium-weight checked before and after six thermo cycles between room temperature and 1300° F. Three of the thermo cycles were followed by air cooling to room temperature while the other three were followed by a water quench to room temperature. The bond between the tube and the tube sheet was impermeable to helium before and after this severe treatment. The explosive charge utilized was pentaerythritol tetranitrate having 400 grains per foot. This explosive has approximately a detonation rate of 7000 meters per second. It should be understood that there is great variance as to size, shape and exact detonation rate of explosive depending upon the application and the geometry for which it is used. Generally, the explosives used, transfer mediums applicable, and various parameters relating thereto are well known in the art of explosive forming and can readily be applied to the concepts of this invention.

A further aspect of this invention is illustrated in FIG. 4 where a method for providing for cold welding long lap joints of similar and dissimilar metals can be obtained utilizing the principle of this invention. The metal sheets 41 and 42 to be welded are ground to a preferred angle of 10 to 50° depending on the width of the overlap desired, thus, providing adjoining beveled surfaces 43 and 44, respectively. The sheets 41 and 42 are positioned in a welding jig and are slightly overlapped whereby the beveled side of the one sheet 42 is in contact with the plane unbeveled surface of the opposite sheet 41. Propagation material such as rubber of proper thickness to provide optimum stand-off distance is placed over the weld area with a sheet explosive placed on top and taped in place. Upon detonation of the explosive directly down upon the upper sheet 41, a jet is created between the two sheets at the beveled area 44 of sheet 42.

In addition to a metallugical bond, the weld is planished by the explosive force. As can be seen in FIG. 4a, a flat bonded surface results with the beveled edge 43 of sheet 41 being compressed at the bond area. Only mechanical cleaning followed by a degreasing rinse, such as acetone, is used. Some materials such as aluminum generally require a more-extensive chemical cleaning cycle. The welding jig 46 utilized for this type of application, though not part of the invention, is comprised, as seen in FIG. 4, of a back up plate 47 and two hold down bars 48. The jig is made of hardened, high impact, shock resistant tool steels. The jig 47 may be greased so as to prevent welding of the parts 41 and 42 thereto. The top of the bottom plate and bottom surfaces of the hold down bars are ground to provide smooth appearance to the area. The hold down bars may be bolted, clamped as shown or held in place by hydraulic rams or other suitable means. The hold down bars are chamfered outward from the bottom to concentrate the explosive force in the weld area. If the material to be welded is such that it must be heated about the transition temperature, then provisions may be incorporated within the jig for heating such as with resistance heating units.

As indicated, the process disclosed herein may be utilized for the bonding of similar and dissimilar metals. The application of the inventive concept is not limited to any particular known metal or variations of metals to be bonded to each other.

Although the invention has been described and illustrated in detail, it is to be clearly understood that the same is by way of illustration and example only and is not to be taken by way of limitation, the spirit and scope of this invention being limited only by the terms of the appended claim.

I claim:

1. The method of explosively welding in a lap joint the edges of two metal sheets comprising:
   providing a first metal sheet having top and bottom surfaces,
   beveling an edge of said first sheet at an oblique angle extending from said bottom surface to said top surface,
   providing a second metal sheet having top and bottom surfaces, beveling an edge of said second sheet at the same oblique angle as said first sheet, said bevel extending from said bottom surface to said top surface, positioning said second sheet and said first sheet such that the bottom of said beveled edge of second sheet corresponds with the top of said beveled edge of said first sheet, effecting an overlap of said sheets essentially equivalent to the width of said bevels, placing an explosive charge adjacent said sheets, exploding said charge so as to force said sheets into a single plane effecting a bond at said overlap area.

References Cited

UNITED STATES PATENTS

| | | | |
|---|---|---|---|
| 1,881,160 | 10/1932 | Armacost | 29—482 |
| 3,197,855 | 8/1965 | Carter et al. | 29—497.5 X |
| 3,212,183 | 10/1965 | Burman et al. | 29—470.1 |
| 3,263,323 | 8/1966 | Maher et al. | 29—421 |
| 3,313,021 | 4/1967 | Wright et al. | 29—421 X |

JOHN F. CAMPBELL, *Primary Examiner.*

P. M. COHEN, *Assistant Examiner.*